(12) United States Patent
Chung et al.

(10) Patent No.: US 10,174,197 B2
(45) Date of Patent: Jan. 8, 2019

(54) SPANDEX FIBER HAVING IMPROVED ADHESIVE CHARACTERISTICS WITH HOT MELT ADHESIVE AND METHOD FOR MANUFACTURING SAME

(71) Applicant: HYOSUNG CORPORATION, Seoul (KR)

(72) Inventors: Hyun Gee Chung, Bucheon-si (KR); Yeon Soo Kang, Gunpo-si (KR)

(73) Assignee: HYOSUNG CORPORATION, Seoul (KR)

( * ) Notice: Subject to any disclaimer, the term of this patent is extended or adjusted under 35 U.S.C. 154(b) by 0 days.

(21) Appl. No.: 14/893,031

(22) PCT Filed: Jan. 7, 2014

(86) PCT No.: PCT/KR2014/000114
§ 371 (c)(1),
(2) Date: Nov. 20, 2015

(87) PCT Pub. No.: WO2015/023032
PCT Pub. Date: Feb. 19, 2015

(65) Prior Publication Data
US 2016/0108237 A1    Apr. 21, 2016

(30) Foreign Application Priority Data
Aug. 13, 2013 (KR) ................. 10-2013-0095836

(51) Int. Cl.
| | |
|---|---|
| *C08L 75/12* | (2006.01) |
| *D01F 1/10* | (2006.01) |
| *D01F 6/70* | (2006.01) |
| *C08L 25/16* | (2006.01) |
| *C08L 31/04* | (2006.01) |
| *B32B 5/02* | (2006.01) |
| *B32B 5/26* | (2006.01) |
| *B32B 7/12* | (2006.01) |
| *B32B 27/12* | (2006.01) |
| *B32B 27/32* | (2006.01) |
| *C09J 123/08* | (2006.01) |

(52) U.S. Cl.
CPC .............. *C08L 75/12* (2013.01); *B32B 5/022* (2013.01); *B32B 5/26* (2013.01); *B32B 7/12* (2013.01); *B32B 27/12* (2013.01); *B32B 27/32* (2013.01); *C08L 25/16* (2013.01); *C08L 31/04* (2013.01); *C09J 123/0853* (2013.01); *D01F 1/10* (2013.01); *D01F 6/70* (2013.01); *B32B 2262/0292* (2013.01); *B32B 2555/02* (2013.01)

(58) Field of Classification Search
None
See application file for complete search history.

(56) References Cited

U.S. PATENT DOCUMENTS

| | | | |
|---|---|---|---|
| 6,083,856 A * | 7/2000 | Joseph ............... | D01F 6/36 428/343 |
| 6,657,009 B2 | 12/2003 | Zhou | |
| 6,774,069 B2 | 8/2004 | Zhou et al. | |
| 6,872,784 B2 | 3/2005 | Zhou | |
| 6,887,941 B2 | 5/2005 | Zhou | |
| 7,241,493 B2 | 7/2007 | Zhou | |
| 7,396,782 B2 | 7/2008 | Blenke et al. | |
| 7,632,764 B2 | 12/2009 | Zhou et al. | |
| 7,745,356 B2 | 6/2010 | Blenke et al. | |
| 7,786,032 B2 | 8/2010 | Zhou et al. | |
| 7,879,745 B2 | 2/2011 | Blenke et al. | |
| 7,922,861 B2 | 4/2011 | Blenke et al. | |
| 2001/0025079 A1* | 9/2001 | Weigl ............... | C08G 18/0895 524/500 |
| 2002/0122953 A1* | 9/2002 | Zhou ............... | B32B 5/02 428/517 |
| 2002/0123538 A1 | 9/2002 | Zhou et al. | |
| 2002/0123726 A1 | 9/2002 | Zhou et al. | |
| 2002/0124956 A1 | 9/2002 | Zhou | |
| 2003/0092792 A1 | 5/2003 | Blenke et al. | |
| 2003/0092818 A1 | 5/2003 | Matsuda et al. | |
| 2004/0038058 A1 | 2/2004 | Zhou | |
| 2005/0054779 A1 | 3/2005 | Zhou | |

(Continued)

FOREIGN PATENT DOCUMENTS

| | | |
|---|---|---|
| CN | 1305508 A | 7/2001 |
| CN | 1308654 A | 8/2001 |

(Continued)

OTHER PUBLICATIONS

PCT International Search Report, PCT/KR2014/000114, dated May 9, 2014, 6 Pages.
Office Action for Japanese Patent Application No. JP 2017-074553, dated May 15, 2018, 9 Pages.

*Primary Examiner* — Michael M Dollinger
(74) *Attorney, Agent, or Firm* — Fenwick & West LLP

(57) ABSTRACT

The present invention relates to a spandex fiber and a method for manufacturing the same that is capable of providing excellent adhesive characteristics, by means of a hot melt adhesive, between the spandex fiber and a polypropylene nonwoven fabric or a polyethylene film, during a diaper-manufacturing process. The method for manufacturing a spandex fiber comprises the steps of: preparing a polyurethane urea solution as a spinning solution; and dry-spinning the spinning solution to obtain the spandex fiber, where the polyurethane urea solution contains, with respect to the weight of the solid content, about 0.1 to 30 wt. % of an ethylene vinyl acetate monomer or polymer, or a derivative thereof, a C9 hydrocarbon-based resin monomer or polymer, or a derivative thereof, a C5 hydrocarbon-based resin monomer or polymer, or a derivative thereof, or a C5/C9 hydrocarbon-based resin monomer or copolymer, or a derivative thereof.

4 Claims, No Drawings

(56) References Cited

U.S. PATENT DOCUMENTS

| | | | |
|---|---|---|---|
| 2005/0054780 A1* | 3/2005 | Zhou | B32B 7/12 |
| | | | 525/240 |
| 2005/0142356 A1 | 6/2005 | Zhou | |
| 2005/0176872 A1* | 8/2005 | Martin | C09J 5/02 |
| | | | 524/515 |
| 2007/0082572 A1 | 4/2007 | Zhou et al. | |
| 2008/0097036 A1 | 4/2008 | Blenke et al. | |
| 2008/0289762 A1 | 11/2008 | Blenke et al. | |
| 2009/0004494 A1 | 1/2009 | Blenke et al. | |
| 2009/0062516 A1* | 3/2009 | Belanger | C13K 13/00 |
| | | | 530/502 |
| 2009/0075540 A1 | 3/2009 | Zhou et al. | |
| 2011/0059143 A1* | 3/2011 | Iavarone | A61K 8/062 |
| | | | 424/401 |
| 2011/0174317 A1 | 7/2011 | Martin | |

FOREIGN PATENT DOCUMENTS

| | | |
|---|---|---|
| CN | 1454232 A | 11/2003 |
| CN | 1918221 A | 2/2007 |
| CN | 102170917 A | 8/2011 |
| JP | 2001-234431 A | 8/2001 |
| JP | 4204191 B2 | 12/2001 |
| JP | 2006-307409 A | 11/2006 |
| JP | 2011-046912 A | 3/2011 |
| JP | 2016-524656 | 8/2016 |
| KR | 10-0455624 B1 | 11/2004 |
| KR | 10-2004-0099669 A | 12/2004 |
| KR | 10-1023378 B1 | 3/2011 |
| KR | 10-2011-0040972 A | 4/2011 |
| WO | WO 02-053668 A2 | 7/2002 |

\* cited by examiner

SPANDEX FIBER HAVING IMPROVED ADHESIVE CHARACTERISTICS WITH HOT MELT ADHESIVE AND METHOD FOR MANUFACTURING SAME

TECHNICAL FIELD

The present invention relates to a spandex fiber having improved adhesive characteristics with a hot melt adhesive and a method for manufacturing the same and, more particularly, to a spandex fiber having improved adhesive characteristics with a hot melt adhesive and a method for manufacturing the same, which can provide improved adhesive characteristics, by means of a hot melt adhesive, between the spandex fiber and a polypropylene nonwoven fabric or a polyethylene film during a diaper-manufacturing process, thereby enhancing the diaper production efficiency.

BACKGROUND ART

In comparison to general fibers for medical use, the conventional medical spandex fibers display stronger adhesion to make fibers stick together. This contributes to poor unwindability, resulting in many breaks of the filaments in the post-process such as covering, warping, knitting, etc., and causes generation of static electricity to make the tension of the fiber non-uniform. Generally, in an attempt to improve this problem, an anti-adhesive is added to the polymer to enhance the characteristics of the polymer.

However, it is reported as a possible problem pertaining to the addition of the anti-adhesive used to lower the adhesion that the spandex fiber for use in the manufacture of diapers is susceptible to a slip-causing deterioration in the adhesion, by means of a hot melt adhesive, between the spandex fiber and a polypropylene nonwoven fabric or a polypropylene film during the diaper-manufacturing process, thereby making it difficult to adhere the spandex fiber properly in the diaper and maintain the shape of the diaper.

For enhancing the adhesion with the hot melt adhesive, an adhesion enhancer is used in an emulsion, or a thermoplastic polyurethane or a rosin-based compound is added to the polymer, in the production of the spandex fiber. But, when the adhesion enhancer is added to the emulsion, its non-uniform distribution in the emulsion may result in an uneven coating on the surface of the fiber. Further, the use of the thermoplastic polyurethane in the polymer has no effect to enhance the adhesion, and the addition of the rosin-based compound in the polymer increases the unwinding fiber tension of the spandex fiber and results in poor unwindability. It is therefore suggested to solve the problem concerning the deterioration in the adhesion by using a hydrocarbon-based resin monomer or polymer, or its derivatives, capable of enhancing the adhesive characteristics without causing a problem with the unwinding fiber tension, in the polymer.

DISCLOSURE OF INVENTION

Technical Problem

The present invention is contrived to solve the above-mentioned problem concerning the poor adhesion, by means of a hot melt adhesive, between the spandex fiber and a polypropylene nonwoven fabric or a polyethylene film during the diaper-manufacturing process. It is therefore an object of the present invention to provide a spandex fiber and its manufacturing method that enhances the adhesive characteristics with the hot melt adhesive used to provide adhesion between the spandex fiber and a polypropylene nonwoven fabric or a polyethylene film in the diaper-manufacturing process.

Technical Solution

In accordance with one embodiment of the present invention, there is provided a spandex fiber having improved adhesive characteristics with a hot melt adhesive, where in a manufacture of the spandex fiber using a polyurethane urea polymer, an ethylene vinyl acetate monomer or polymer, or a derivative thereof represented by the following chemical formula 1 is used as an adhesion enhancer in an amount of about 0.1 to 30 wt. % to enhance the adhesive characteristics with the hot melt adhesive,

[Chemical Formula 1]

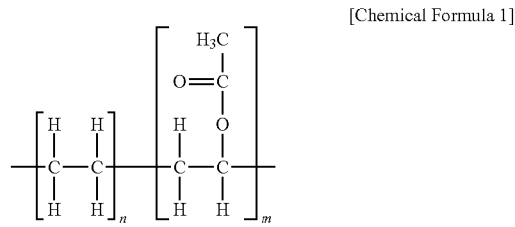

According to the present invention, there is provided a spandex fiber having improved adhesive characteristics with a hot melt adhesive, where in a manufacture of the spandex fiber using a polyurethane urea polymer, a C9 hydrocarbon-based resin monomer or polymer, or a derivative thereof represented by the following chemical formula 2 is used as an adhesion enhancer in an amount of about 0.1 to 30 wt. % to enhance the adhesive characteristics with the hot melt adhesive,

[Chemical Formula 2]

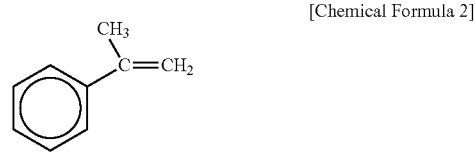

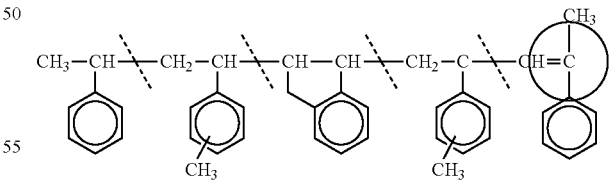

According to the present invention, there is provided a spandex fiber having improved adhesive characteristics with a hot melt adhesive, where in a manufacture of the spandex fiber using a polyurethane urea polymer, a C5 hydrocarbon-based resin monomer or polymer, or a derivative thereof represented by the following chemical formula 3 is used as an adhesion enhancer in an amount of about 0.1 to 30 wt. % to enhance the adhesive characteristics with the hot melt adhesive,

[Chemical Formula 3]

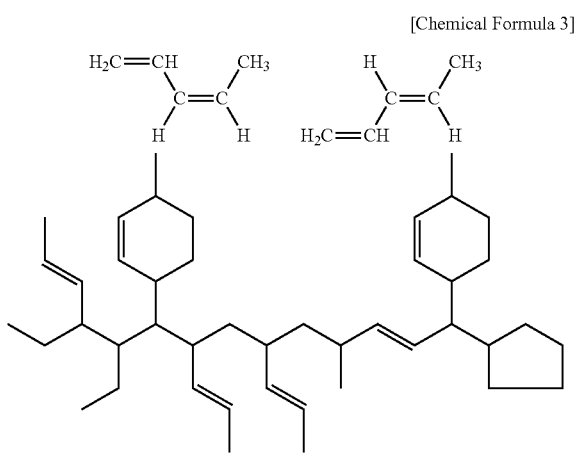

According to the present invention, there is provided a spandex fiber having improved adhesive characteristics with a hot melt adhesive, where in a manufacture of the spandex fiber using a polyurethane urea polymer, a C5/C9 hydrocarbon-based resin copolymer or a derivative thereof is used as an adhesion enhancer in an amount of about 0.1 to 30 wt. % to enhance the adhesive characteristics with the hot melt adhesive, a C5/C9 hydrocarbon-based resin copolymer or a derivative thereof being prepared by copolymerization of a C9 hydrocarbon-based resin monomer or polymer, or a derivative thereof represented by the chemical formula 2 and a C5 hydrocarbon-based resin monomer or polymer, or a derivative thereof represented by the chemical formula 3.

In accordance with another embodiment of the present invention, there is provided a method for manufacturing a spandex fiber having improved adhesive characteristics with a hot melt adhesive, where in a manufacture of the spandex fiber using a polyurethane urea polymer, an ethylene vinyl acetate monomer or polymer, or a derivative thereof represented by the chemical formula 1 is used as an adhesion enhancer in an amount of about 0.1 to 30 wt. % to enhance the adhesive characteristics with the hot melt adhesive.

According to the present invention, there is provided a method for manufacturing a spandex fiber having improved adhesive characteristics with a hot melt adhesive, where in a manufacture of the spandex fiber using a polyurethane urea polymer, a C9 hydrocarbon-based resin monomer or polymer, or a derivative thereof represented by the chemical formula 2 is used as an adhesion enhancer in an amount of about 0.1 to 30 wt. % to enhance the adhesive characteristics with the hot melt adhesive.

According to the present invention, there is provided a method for manufacturing a spandex fiber having improved adhesive characteristics with a hot melt adhesive, where in a manufacture of the spandex fiber using a polyurethane urea polymer, a C5 hydrocarbon-based resin monomer or polymer, or a derivative thereof represented by the chemical formula 3 is used as an adhesion enhancer in an amount of about 0.1 to 30 wt. % to enhance the adhesive characteristics with the hot melt adhesive.

According to the present invention, there is provided a method for manufacturing a spandex fiber having improved adhesive characteristics with a hot melt adhesive, where in a manufacture of the spandex fiber using a polyurethane urea polymer, a C5/C9 hydrocarbon-based resin copolymer or a derivative thereof is used as an adhesion enhancer in an amount of about 0.1 to 30 wt. % to enhance the adhesive characteristics with the hot melt adhesive, a C5/C9 hydrocarbon-based resin copolymer or a derivative thereof being prepared by copolymerization of a C9 hydrocarbon-based resin monomer or polymer, or a derivative thereof represented by the chemical formula 2 and a C5 hydrocarbon-based resin monomer or polymer, or a derivative thereof represented by the chemical formula 3.

Effects of the Invention

The present invention involves using an ethylene vinyl acetate monomer or polymer, or its derivative, a C9 hydrocarbon-based resin monomer or polymer, or its derivative, a C5 hydrocarbon-based resin monomer or polymer, or its derivative, or a C5/C9 hydrocarbon-based resin monomer or copolymer, or its derivative in a spinning solution for spandex fiber, to enhance the adhesion, by means of the hot melt adhesive, between the spandex fiber and a polypropylene nonwoven fabric or a polyethylene film in the diaper-manufacturing process, thereby reducing the used amount of the hot melt adhesive in the diaper-manufacturing process, which leads to reduction of the diaper production cost, and causing no problem with the adhesive characteristics even with an increase of the diaper production speed, which contributes to the improvement of the productivity.

BEST MODES FOR CARRYING OUT THE INVENTION

Hereinafter, a detailed description will be given as to the polyurethane urea elastic yarn of the present invention. The embodiment of the present invention can be modified in various forms and the range of the present invention is not limited to the embodiments hereinafter described.

The embodiment of the present invention is provided for better understandings of the present invention to the skilled in the art.

In addition, throughout this specification, unless the context requires otherwise, the word "comprise", "includes" or variations will be understood to imply to inclusion of any other component in addition to the stated one.

The present invention is to enhance the adhesion, by mean of the hot melt adhesive, between the spandex fiber and a polypropylene nonwoven fabric or a polyethylene film during the diaper-manufacturing process.

In order to enhance the adhesion, by means of the hot melt adhesive, between the spandex fiber and a polypropylene nonwoven fabric or a polyethylene film during the diaper-manufacturing process, according to the present invention, an ethylene vinyl acetate monomer or polymer, or its derivative as represented by the chemical formula 1, a C9 hydrocarbon-based resin monomer or polymer, or its derivative as represented by the chemical formula 2, a C5 hydrocarbon-based resin monomer or polymer, or its derivative as represented by the chemical formula 3, or a C5/C9 hydrocarbon-based resin monomer or copolymer, or its derivative are used as an adhesion enhancer in an amount of about 0.1 to 30 wt. % to enhance the adhesive characteristics.

According to the present invention, when the content of the adhesion enhancer that comprises the ethylene vinyl acetate monomer or polymer, or its derivative, the C9 hydrocarbon-based resin monomer or polymer, or its derivative, the C5 hydrocarbon-based resin monomer or polymer, or its derivative, or the C5/C9 hydrocarbon-based resin monomer or copolymer, or its derivative is less than 0.1 wt. %, it is too insignificant to make an effect of improving the adhesive characteristics as required. In contrast, when the content of the adhesion enhancer is greater than 30 wt. %, it is impossible to secure the required properties of the spandex fiber after the production of the spandex fiber.

Spandex fibers, high-elasticity polyurethane-based fibers containing at least 85 wt. % of urethane bonds, are produced in four different ways: dry spinning, wet spinning, reaction spinning, and melt spinning. In the dry spinning process, a spinning solution containing a polyurethane resin composition is extruded through a nozzle and solidified in a stream of hot gas introduced by evaporating and drying the solvent. The wet spinning process involves having the spinneret immersed in tanks containing a solvent in which polymers are dissolved, to solidify the polymers by the eluting action of the solvent. The reaction spinning process is the process of extruding a prepolymer solution containing isocyanate in a reactant solution containing an amine chain extender through a nozzle by way of a chain extension reaction. In the melt spinning process, the polyurethane resin composition is melted for extrusion through a nozzle and then directly solidified by cooling.

The method of manufacturing a spandex fiber according to the present invention includes the steps of: reacting polyether glycol with an aromatic diisocyanate in the nitrogen atmosphere to prepare a polyurethane prepolymer; and dissolving the polyurethane prepolymer in a solvent and adding an aliphatic diamine to prepare a polyurethane urea solution. The method may further include the step of adding, with respect to the solid content of the polymer, about 1 wt. % of triethylene glycol-bis-3-(3-tertiary-butyl-4-hydroxy-5-methylphenyl)propionate as an antioxidant and about 2 wt. % of titanium dioxide as a delustrant to prepare the final spinning solution.

Specific examples of the polyether glycol as used herein may include polytetramethylene ether glycol, polypropylene glycol, polycarbonate diol, etc. The molecular weight of the polyether glycol is preferably in the range of 1,000 to 3,100. When the molecular weight of the polyether glycol is less than 1,000, the fiber may have low elongation and hence deterioration in the functions as a spandex fiber. In contrast, when the molecular weight of the polyether glycol is greater than 3,100, the degree of crystallization of the fiber is too high to normally realize the elasticity.

Specific examples of the organic diisocyanate as used herein may include diphenylmethane-4,4'-diisocyanate, hexamethylene diisocyanate, toluene diisocyanate, butylene diisocyanate, hydrogenated diphenylmethane-4,4'-diisocyanate, methylene-bis(4-phenylisocyanate), 2,4-tolylene diisocyanate, methylene-bis(4-cyclohexylisocyanate), isophorone diisocyanate, tetramethylene-p-xylene diisocyanate, and a mixture thereof.

The diamine is used as a chain extender. Specific examples of the diamine as used herein may include ethylene diamine, propylene diamine, hydrazine, 1,4-cyclohexane diamine, hydrogenated m-phenylene diamine (HPMD), 2-methylpentamethylene diamine (MPMD), etc. The chain extender may be at least one of ethylene diamine, 1,3-propylene diamine and 1,4-cyclohexane diamine in combination with HPMD, MPMD and/or 1,2-propylene diamine. The monoamine is used as a chain terminator. Specific examples of the monoamine as used herein may include diethyl amine, monoethanol amine, dimethyl amine, etc.

Hereinafter, the present invention will be described in further detail by way of the following examples, which are not intended to limit the scope of the present invention.

EXAMPLE 1

601.1 g of diphenyl methane-4,4'-diisocyanate and 2,664.5 g of polytetramethlene ether glycol (Mw: 1,800) are reacted in a stream of nitrogen gas under agitation at 90° C. for 95 minutes to prepare a polyurethane prepolymer having isocyanate groups at both ends.

The prepolymer is cooled down to the room temperature, and 4,811 g of dimethyl acetamide is added to dissolve the prepolymer, thereby obtaining a polyurethane prepolymer solution.

Subsequently, 43.3 g of ethylene diamine, 13.4 g of 1,2-propylene diamine and 5.7 g of diethyl amine are dissolved in 829 g of dimethyl acetamide, and the resultant solution is added to the prepolymer solution at 9° C. or below to prepare a polyurethane solution. With respect to the solid content of the polymer, 1 wt. % of triethylene glycol-bis-3-(3-tertiary-butyl-4-hydroxy-5-methylphenyl)propionate as an antioxidant and 2 wt. % of titanium dioxide as a delustrant are used as additives to obtain a spinning solution. In addition, 0.5 wt. % of an ethylene vinyl acetate polymer is further added as an adhesion enhancer to the spinning solution.

After defoamation, the spinning solution is subjected to a dry spinning process at 260° C. or above and wound at a winding speed of 400 m/min to produce a 56-filament 840-denier spandex fiber.

EXAMPLE 2

The procedures are performed in the same manner as described in Example 1 to prepare a spandex fiber, excepting that 3 wt. % of an ethylene vinyl acetate polymer is used as an adhesion enhancer in the spinning solution.

EXAMPLE 3

The procedures are performed in the same manner as described in Example 1 to prepare a spandex fiber, excepting that 0.5 wt. % of a C9 hydrocarbon-based resin polymer is used as an adhesion enhancer in the spinning solution.

EXAMPLE 4

The procedures are performed in the same manner as described in Example 1 to prepare a spandex fiber, excepting that 3 wt. % of a C9 hydrocarbon-based resin polymer is used as an adhesion enhancer in the spinning solution.

EXAMPLE 5

The procedures are performed in the same manner as described in Example 1 to prepare a spandex fiber, excepting that 0.5 wt. % of a C5 hydrocarbon-based resin polymer is used as an adhesion enhancer in the spinning solution.

EXAMPLE 6

The procedures are performed in the same manner as described in Example 1 to prepare a spandex fiber, excepting that 0.5 wt. % of a C5/C9 hydrocarbon-based resin copolymer is used as an adhesion enhancer in the spinning solution.

COMPARATIVE EXAMPLE 1

The procedures are performed in the same manner as described in Example 1 to prepare a spandex fiber, excepting that 33 wt. % of an ethylene vinyl acetate polymer is used as an adhesion enhancer in the spinning solution.

COMPARATIVE EXAMPLE 2

The procedures are performed in the same manner as described in Example 1 to prepare a spandex fiber, excepting that 33 wt. % of a C9 hydrocarbon-based resin polymer is used as an adhesion enhancer in the spinning solution.

COMPARATIVE EXAMPLE 3

The procedures are performed in the same manner as described in Example 1 to prepare a spandex fiber, excepting that 33 wt. % of a C5 hydrocarbon-based resin polymer is used as an adhesion enhancer in the spinning solution.

COMPARATIVE EXAMPLE 4

The procedures are performed in the same manner as described in Example 1 to prepare a spandex fiber, excepting that 33 wt. % of a C5/C9 hydrocarbon-based resin copolymer is used as an adhesion enhancer in the spinning solution.

COMPARATIVE EXAMPLE 5

The procedures are performed in the same manner as described in Example 1 to prepare a spandex fiber, excepting that no adhesion enhancer is used in the spinning solution.

COMPARATIVE EXAMPLE 6

The procedures are performed in the same manner as described in Example 1 to prepare a spandex fiber, excepting that a thermoplastic polyurethane is used without adding an adhesion enhancer in the spinning solution.

COMPARATIVE EXAMPLE 7

The procedures are performed in the same manner as described in Example 1 to prepare a spandex fiber, excepting that a rosin compound is used without adding an adhesion enhancer in the spinning solution.

Evaluation of Adhesive Characteristic (Creep Capability)

The spandex fibers obtained in Examples and Comparative Examples are evaluated in regards to the adhesive characteristics as follows. For evaluations, the spandex fibers are used to manufacture diapers of which the specimens are used in the evaluations.

With the fiber added on a diaper, an adhesive portion to which a polypropylene nonwoven fabric and a polyethylene film are adhered is taken and subjected to evaluation on the creep capability according to the evaluation method designed by U Corp. in Japan.

Step 1: An adhesive portion with the spandex fiber is stretched to the maximum as long as the length of the diaper and fixed on a 30 cm×50 cm plastic sheet.

Step 2: An oil-based pen is used to mark an initial length (200 mm in total) from left to right each 100 mm distant from the center of the specimen.

Step 3: The marked portion is cut with a knife, and the length of the spandex pressed out is measured with a rule.

Adhesive characteristic(creep capability) (%)=[200−(pressed-out length)]/200*100

The evaluation results in regards to the adhesion of the spandex fibers according to Examples 1 to 6 and Comparative Examples 1 to 7 are presented in Table 1.

TABLE 1

| Div. | | Adhesive characteristic (%) |
|---|---|---|
| Example | 1 | 95.3 |
| | 2 | 98.1 |
| | 3 | 94.5 |
| | 4 | 98.3 |
| | 5 | 94.8 |
| | 6 | 95.2 |
| Comparative Example | 1 | 96.8 |
| | 2 | 95.9 |
| | 3 | 96.1 |
| | 4 | 95.3 |
| | 5 | 82.1 |
| | 6 | 84.7 |
| | 7 | 81.3 |

Referring to Table 1, the spandex fibers produced from the spinning polymer using an ethylene vinyl acetate polymer, a C9 hydrocarbon-based resin polymer, a C5 hydrocarbon-based resin polymer, or a C5/C9 hydrocarbon-based resin copolymer (Examples 1 to 6) are superior in the adhesive characteristic (creep capability) to those produced from the spinning polymer using none of the above-mentioned substances or using a substance other than the above-mentioned ones (Comparative Examples 5, 6 and 7).

Evaluation of Unwinding Fiber Tension

The spandex fibers obtained in Examples and Comparative Examples are evaluated in regards to the uniformity of the unwinding characteristic in addition to the adhesion as follows.

In the evaluation method, a guide for fixing a fiber specimen is installed at a position 30 cm distant from the fixed bobbin holder, and a sensor for tension measurement and a filament winding device capable of controlling the winding speed are provided to conduct the evaluations.

The tension measurement device used in the evaluation is a Rothschild electronic tension meter. The measurements, such as maximum (Max.), minimum (Min.), average (Ave.), and deviation (Dev.) values, are presented in Table 2.

With the lower levels of the difference between the maximum (Max.) and minimum (Min.) values and the average (Ave.) value and with the lower deviation (Dev.) value, the fiber is considered to be more excellent in uniformity of the unwinding characteristic.

TABLE 2

| Div. | | Max. (g) | Min (g) | Ave. (g) | Dev. (g) |
|---|---|---|---|---|---|
| Example | 1 | 4.35 | 0.68 | 1.35 | 0.35 |
| | 2 | 4.68 | 0.82 | 1.69 | 0.48 |
| | 3 | 3.95 | 0.59 | 1.23 | 0.38 |
| | 4 | 4.23 | 0.55 | 1.55 | 0.58 |
| | 5 | 3.88 | 0.44 | 1.44 | 0.42 |
| | 6 | 4.54 | 0.62 | 1.53 | 0.53 |
| Comparative Example | 1 | 4.33 | 0.95 | 1.64 | 0.65 |
| | 2 | 4.57 | 0.73 | 1.86 | 0.78 |
| | 3 | 4.23 | 0.65 | 1.68 | 0.59 |
| | 4 | 4.95 | 0.81 | 1.70 | 0.52 |
| | 5 | 5.33 | 1.11 | 1.25 | 0.41 |
| | 6 | 4.26 | 0.77 | 1.47 | 0.65 |
| | 7 | 10.41 | 2.71 | 5.55 | 1.54 |

Referring to Table 2, the spandex fibers produced from the spinning polymer using an ethylene vinyl acetate polymer, a C9 hydrocarbon-based resin polymer, a C5 hydrocarbon-based resin polymer, or a C5/C9 hydrocarbon-based resin copolymer (Examples 1 to 6) has no problem with the unwinding fiber tension. When using the above-mentioned compounds as an adhesion enhancer in an amount of 30 wt.

% or greater (Comparative Examples 1 to 4), no problem with the unwinding fiber tension appears. But, when the rosin compound is added as an adhesion enhancer (Comparative Example 7), it results in poor unwinding fiber tension.

Strength and Elongation of Fiber

An automatic strength/elongation measurement device (MEL series, Textechno Inc.) is used to measure the strength and elongation of specimens each 10 cm long under the tensile strength of 100 cm/min. The strength and the elongation at break are measured.

According to the property management standards for spandex fiber, the strength is 0.7 g/d or higher and the elongation is 500% or above.

TABLE 3

| Div. | | Strength (g/d) | Elongation (%) |
|---|---|---|---|
| Example | 1 | 1.01 | 592 |
| | 2 | 0.95 | 584 |
| | 3 | 0.98 | 588 |
| | 4 | 1.04 | 575 |
| | 5 | 1.05 | 604 |
| | 6 | 0.99 | 599 |
| Comparative Example | 1 | 0.65 | 477 |
| | 2 | 0.68 | 483 |
| | 3 | 0.61 | 451 |
| | 4 | 0.64 | 490 |
| | 5 | 0.99 | 602 |
| | 6 | 1.01 | 588 |
| | 7 | 1.00 | 579 |

Referring to Table 3, the spandex fibers produced from the spinning polymer using an ethylene vinyl acetate polymer, a C9 hydrocarbon-based resin polymer, a C5 hydrocarbon-based resin polymer, or a C5/C9 hydrocarbon-based resin copolymer (Examples 1 to 6) has no problem with the unwinding fiber tension. But, when using the above-mentioned compounds as an adhesion enhancer in an amount of 30 wt. % or greater (Comparative Examples 1 to 4), the basic properties of the spandex fiber, such as strength and elongation are far below the management standards.

INDUSTRIAL APPLICABILITY

The present invention, which relates to a spandex fiber having improved adhesive characteristics and its manufacturing method, is a very useful invention in the industrial aspects.

What is claimed is:

1. A spandex fiber having improved adhesive characteristics with a hot melt adhesive, wherein in a manufacture of the spandex fiber using a polyurethane urea polymer, a C9 hydrocarbon-based monomer represented by chemical formula 1 is used as an adhesion enhancer in an amount of 0.1 to 30 wt. % with respect to solid content of the polyurethane urea polymer to enhance the adhesive characteristics with the hot melt adhesive,

[Chemical Formula 1]

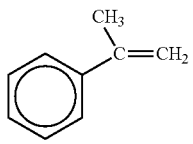

wherein a strength of the spandex fiber is 0.7 g/d or above and an elongation of the spandex fiber is 500% or above.

2. A spandex fiber having improved adhesive characteristics with a hot melt adhesive, wherein in a manufacture of the spandex fiber using a polyurethane urea polymer, a C5/C9 hydrocarbon-based copolymer prepared by copolymerization of the C9 hydrocarbon-based monomer represented by chemical formula 1 and C5 hydrocarbon-based monomer represented by chemical formula 2 is used as an adhesion enhancer in an amount of 0.1 to 30 wt. % with respect to solid content of the polyurethane urea polymer to enhance the adhesive characteristics with the hot melt adhesive,

[Chemical Formula 1]

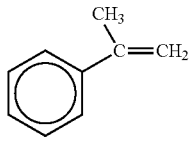

[Chemical Formula 2]

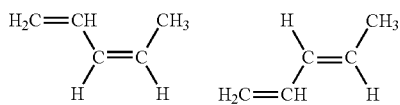

wherein a strength of the spandex fiber is 0.7 g/d or above and an elongation of the spandex fiber is 500% or above.

3. The spandex fiber of claim 1, wherein the strength of the spandex fiber is at 0.98 g/d or above and the elongation of the spandex fiber is 575% or above.

4. The spandex fiber of claim 2, wherein the strength of the spandex fiber is at 0.99 g/d or above and the elongation of the spandex fiber is 599% or above.

* * * * *